US008942956B1

(12) United States Patent
Perry et al.

(10) Patent No.: US 8,942,956 B1
(45) Date of Patent: Jan. 27, 2015

(54) METHOD AND APPARATUS FOR BUILDING AND PRESENTING NETWORK DESIGNS

(75) Inventors: Alexander Robert Perry, Santa Monica, CA (US); Yo Eun Ko, Mountain View, CA (US); John Hendrickson, Chatsworth, CA (US); James Fintan Kelly, Milpitas, CA (US); Michael Skinner, Seattle, WA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 13/398,159

(22) Filed: Feb. 16, 2012

(51) Int. Cl.
*G06F 17/50* (2006.01)
*H04L 12/707* (2013.01)
*H04L 12/733* (2013.01)
*H04L 12/753* (2013.01)
*H04L 12/24* (2006.01)

(52) U.S. Cl.
CPC ....... *H04L 45/22* (2013.01); *H04M 2203/2022* (2013.01); *H04L 45/122* (2013.01); *H04L 45/48* (2013.01); *H04L 41/145* (2013.01); *H04L 41/0826* (2013.01)
USPC .................................. 703/1; 703/2; 718/105

(58) Field of Classification Search
None
See application file for complete search history.

(56) References Cited

U.S. PATENT DOCUMENTS

| | | | | |
|---|---|---|---|---|
| 5,115,495 | A * | 5/1992 | Tsuchiya et al. | 709/239 |
| 5,404,451 | A | 4/1995 | Nemirovsky et al. | |
| 6,577,711 | B1 * | 6/2003 | Williamson et al. | 379/22.03 |
| 6,879,941 | B1 * | 4/2005 | Ehrenberg et al. | 703/1 |
| 7,065,476 | B2 * | 6/2006 | Dessureault et al. | 703/2 |
| 7,207,012 | B1 * | 4/2007 | House et al. | 715/853 |
| 7,509,579 | B1 * | 3/2009 | House et al. | 715/714 |
| 7,958,241 | B2 * | 6/2011 | Barillaud et al. | 709/226 |
| 8,364,445 | B2 * | 1/2013 | Okada et al. | 703/1 |
| 8,396,364 | B2 * | 3/2013 | Lee et al. | 398/49 |
| 8,509,098 | B2 * | 8/2013 | Atkinson et al. | 370/252 |
| 8,521,411 | B2 * | 8/2013 | Grabowski et al. | 701/532 |
| 2002/0156919 | A1 * | 10/2002 | Maeno | 709/238 |
| 2003/0112958 | A1 * | 6/2003 | Beaudoin et al. | 379/221.15 |
| 2003/0200062 | A1 * | 10/2003 | Dessureault et al. | 703/1 |
| 2004/0059539 | A1 * | 3/2004 | Otsuki et al. | 702/150 |
| 2004/0258105 | A1 * | 12/2004 | Spathas et al. | 370/539 |
| 2007/0038415 | A1 * | 2/2007 | Okada et al. | 703/1 |
| 2008/0091387 | A1 * | 4/2008 | Yamazaki et al. | 703/1 |
| 2010/0086254 | A1 * | 4/2010 | Dofher | 385/24 |
| 2010/0235147 | A1 * | 9/2010 | Okada et al. | 703/1 |

OTHER PUBLICATIONS

T. H. Wu, R. H. Cardwell, "Optimum Routing for Fiber Network Design: Model and Applications" pp. 0054-0060, IEEE 1988.*

(Continued)

*Primary Examiner* — Omar Fernandez Rivas
*Assistant Examiner* — Kimbrom K Gebresilassie
(74) *Attorney, Agent, or Firm* — Lerner, David, Littenberg, Krumholz & Mentlik, LLP

(57) ABSTRACT

A method and apparatus is provided for presenting a design of a fiber-optic network. In one aspect, a server receives from a client device a request for a diagram of the design. The server accesses a data-structure representing the design, generates a representation of a cable run, and transmits the representation to the client device for display. In another aspect, the server transmits to the client device an indication that the cable run is illegal and receives from the client device an indication of a user-specified cable run. Subsequently, the server modifies the data structure to replace the illegal cable run with the user-specified cable run.

19 Claims, 14 Drawing Sheets

(56) References Cited

OTHER PUBLICATIONS

T. H. Wu, D. J. Kolar, and R. H. Cardwell, "Survivable Network Architectures for Broad-Band fiber Optic Networks: Model and Performance Comparison" pp. 1698-1709, 1988 IEEE.*

R.H. Cardwell, C. L. Monma, and T. H. Wu, "Computer Aided Design Procedures for Survivable Fiber OPptic Networks" pp. 1188-1197, 1989 IEEE.*

Bentley Sustaining Infrastructure, "Fiber-To_The_Home (Ftth) Tools", Copyright 2009, 2 pages.

Draka, "Value Innovation for your Next Generation Access Network", <www.draka.com/communications>, Copyright 2011, 20 pages.

FiberPlanIT—FTTx Network Design Tool, <http://www.comsof.com/fiberplanit>, Downloaded on Aug. 27, 2013, 2 pages.

GE Smallworld Data Solutions / Safe Woftware, "Easily Move Data Into and Out of GE Smallworld", <http://www,safe.com/solutions/for-applications/ge-smallworld/>, Downloaded on Aug. 27, 2013, 3 pages.

VPIsystems Drives Fiber Home, VPIsystems Blog, Posted by Bill Klinger on Monday, May 4, 2009 @ 12:13 PM.

Bourjolly, et al., Using Simulated Annealing to Minimize the Cost of Centralized Telecommunications Networks; INFOR, Aug. 1999, 37, 3; 1999, pp. 271-296.

Kershenbaum et al., Mentor: An Algorithm for Mesh Network Topological Optimization and Routing: IEEE Transactions on Communications, vol. 39, No. 4, Apr. 1991; pp. 503-513.

Tcha et al., Conduit and Cable Installation for a Centralized Network with Logical Star-Star Topology; IEEE Transactions on Communications, vol. 43, No. 2/3/4, 1995; pp. 958-967.

* cited by examiner

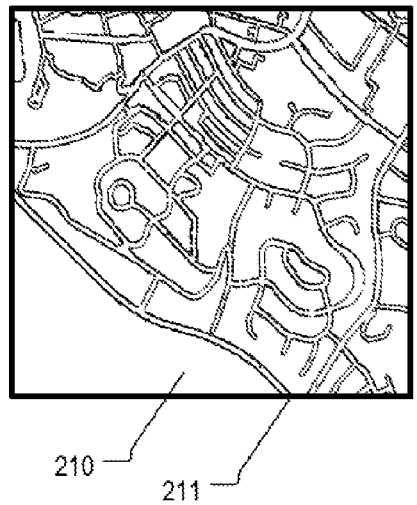
Map of Service Area 210
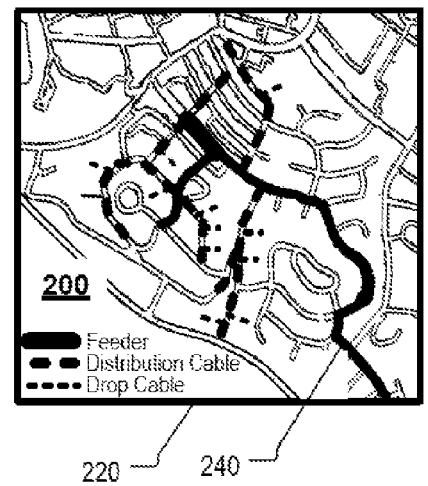
Diagram of Topology of Network 240
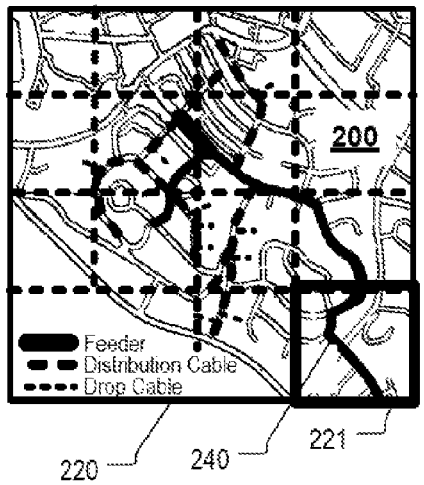
Diagram of Topology of Network 240 Displayed in a Tiled Fashion
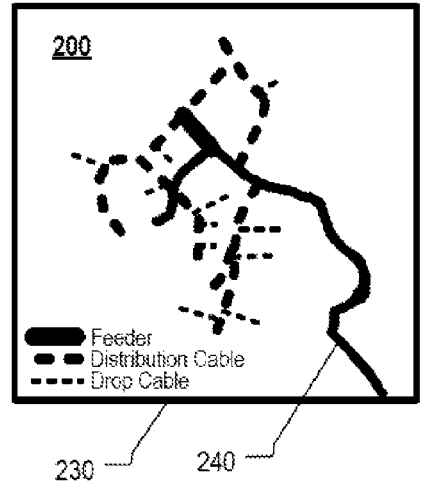
Diagram of Topology of Network 240 Displayed Without a Map
Fig. 2

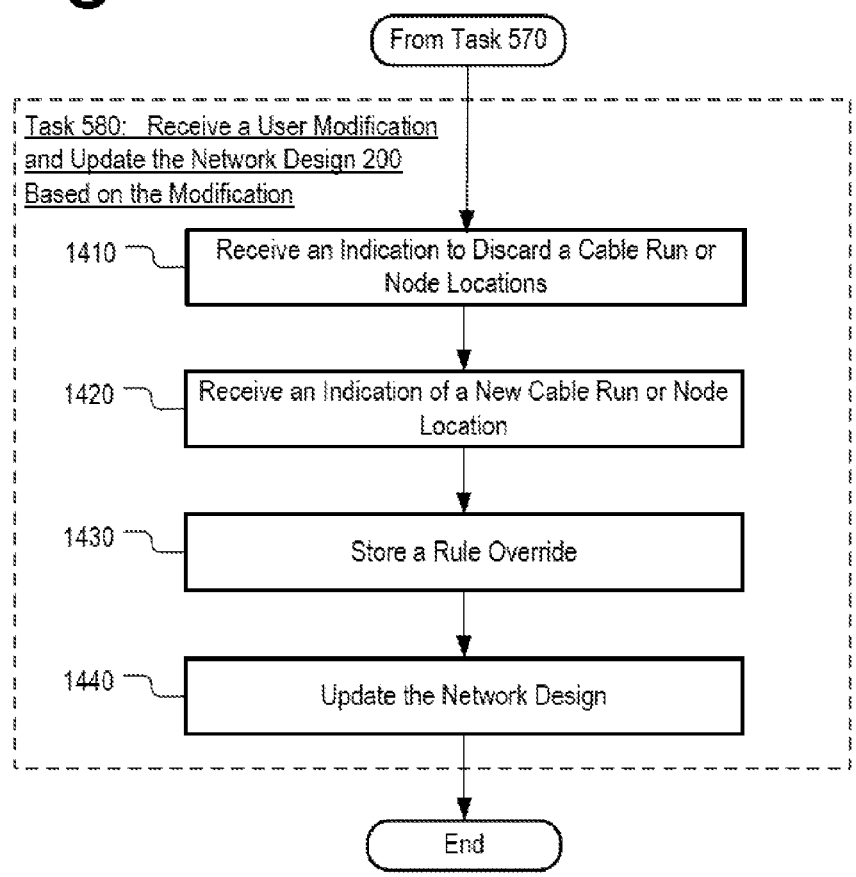

METHOD AND APPARATUS FOR BUILDING AND PRESENTING NETWORK DESIGNS

CROSS-REFERENCE TO RELATED APPLICATION

This application is related to U.S. patent application Ser. No. 13/398,279 filed Feb. 16, 2012 entitled "METHOD AND APPARATUS FOR BUILDING AND PRESENTING NETWORK DESIGNS" filed concurrently herewith, the entire disclosure of which is hereby incorporated by reference herein.

BACKGROUND

Copper wire and wireless are the primary transmission media in networks that deliver data to user homes. Copper and wireless networks, however, currently have bandwidth limitations and can have difficulties meeting increasing service demands. As a result, various communities have begun upgrading their networks to use optical fibers. An optical fiber is a flexible transparent fiber made of very pure glass (silica) that can be used to transmit data over long distances. Networks that use optical fiber oftentimes have improved characteristics over their copper and wireless counterpart.

SUMMARY

According to one aspect, a method for providing a design for a fiber-optic network to a client device is provided. The method includes receiving a request for a diagram associated with a design for a fiber-optic network and accessing a data structure representing the design for the fiber-optic network. The data structure may identify a first path of a first cable run and a first characteristic of the first cable run. In addition, the data structure may identify a second path of a second cable run and a second characteristic of the second cable run. After the data structure is accessed, a representation of a cable run for display in a diagram of the design of the fiber-optic network may be generated when it is determined that the first path is coincident with the second path. Afterwards, an indication of the representation of the cable run may be transmitted to the client device for presentation to a user. The representation of the cable run may include an indication of the first path and the second path, and an indication of a third characteristic of a given cable run. The third characteristic of the given cable run may be based on the first characteristic of the first cable run and the second characteristic of the second cable run.

In one example, the representation may be generated prior to receiving the request. In some instances, the request may be for a tile of the diagram and the representation of the cable run may be generated based on an indication of a location of the tile. Furthermore, the indication of the first path and the second path may include a beginning coordinate followed by one or more segment indications, each segment indication comprising an indication of a length of the segment and an indication of an orientation of the segment.

In another example, the third characteristic may relate to one of cost, length, distance, number of cable strands, and installation technology. The third characteristic may be identical to the first characteristic and different from the second characteristic or, alternatively, the third characteristic may be different from both the first characteristic and the second characteristic.

In yet another example, at least one of the first cable run and the second cable run may be selected by a processor for inclusion into the diagram. The at least one of the first cable run and the second cable run may be selected out of a plurality of elements of the fiber-optic network that are located in a region of the fiber-optic network that is to be depicted in the diagram. The at least one of the first cable run and the second cable run may be selected based on an indication of a scale of a map that is available at the client device.

In another aspect, an apparatus is provided that comprises a processor. The processor is configured to generate a data structure that represents a design for a fiber-optic network, process the data structure to identify a first cable run that is to be installed across a section of a service area, and determine whether the installation of the first cable run across the section of the service area is illegal. The determination may be based on a rule that relates cable installation technology to one or more sections of the service area. In addition, the processor may be configured to transmit an indication that the installation of the first cable run is illegal to a client device and receive an indication from the client device to delete the first cable run from the design for the fiber-optic network and to replace the first cable run with a second cable run. Furthermore, the processor may modify the design for the fiber-optic network to remove the first cable run from the data structure, and include the second cable run in the data structure that represents the design for the fiber-optic network.

In one example, the second cable run may have a different track from the first cable run, and the first cable run and the second cable run may both connect a first node in the fiber-optic network to a second node in the fiber-optic network.

In another example, the processor may be further configured to generate a representation of the first cable run for display in a diagram of the design of the fiber-optic network. The indication that the first cable run is illegal may be a color value corresponding to the first cable run or it may be a text note.

In yet another aspect, a method is provided that comprises receiving, at a client device, an indication that a first cable run between two nodes in a fiber-optic network is illegal. The first cable run may be part of a design for the fiber-optic network, and the first cable run may be generated automatically by a server when the design for the fiber-optic network is produced. Furthermore, the method may comprise presenting the indication that the first cable run is illegal and a diagram of a design of the fiber-optic network on a display device, receiving at the client device, user input indicating a second cable run that replaces the first cable run, and transmitting, from the client device to the server, an indication of the second cable run for modification of the design of the fiber-optic network.

In one example, the presentation of the indication that the first cable run is illegal may include displaying, on the display device, the diagram of the design of the fiber-optic network so that the first cable run is colored differently from cable runs that are legal. In another example, the presentation of the indication that the first cable run is illegal may include displaying a text note. In yet another example, the presentation of the indication that the first cable run is illegal may include displaying an image.

BRIEF DESCRIPTION OF THE DRAWINGS

FIG. 2 depicts an example of different maps and diagrams associated with a network design.

FIG. 14 depicts another flowchart of subtasks associated with FIG. 5.

DETAILED DESCRIPTION

A network planner application may also be provided that generates a design of a communications network for a service area and provides a bill of materials for the design. The generated bill of materials may include any information that is typically found in bills of materials, such as engineering bills of materials and sales bills of materials. It may list components, assemblies, sub-assemblies, and quantities of each, needed to put the designed network in place. Upon obtaining the bill of materials from the network planner application, a user can take it to different vendors and use it in soliciting bids.

A network planner application may also be provided that produces diagrams of network designs, where the diagrams show the locations of different network components such as endpoints and switches, as well as the different cable runs in the network. The network planner application may use existing map services, such as GOOGLE MAPS to render the diagrams. The network planner may download maps from those services and render the diagrams over of the downloaded maps. In that regard, the planner application may operate without maintaining its own map database.

Figure 1:
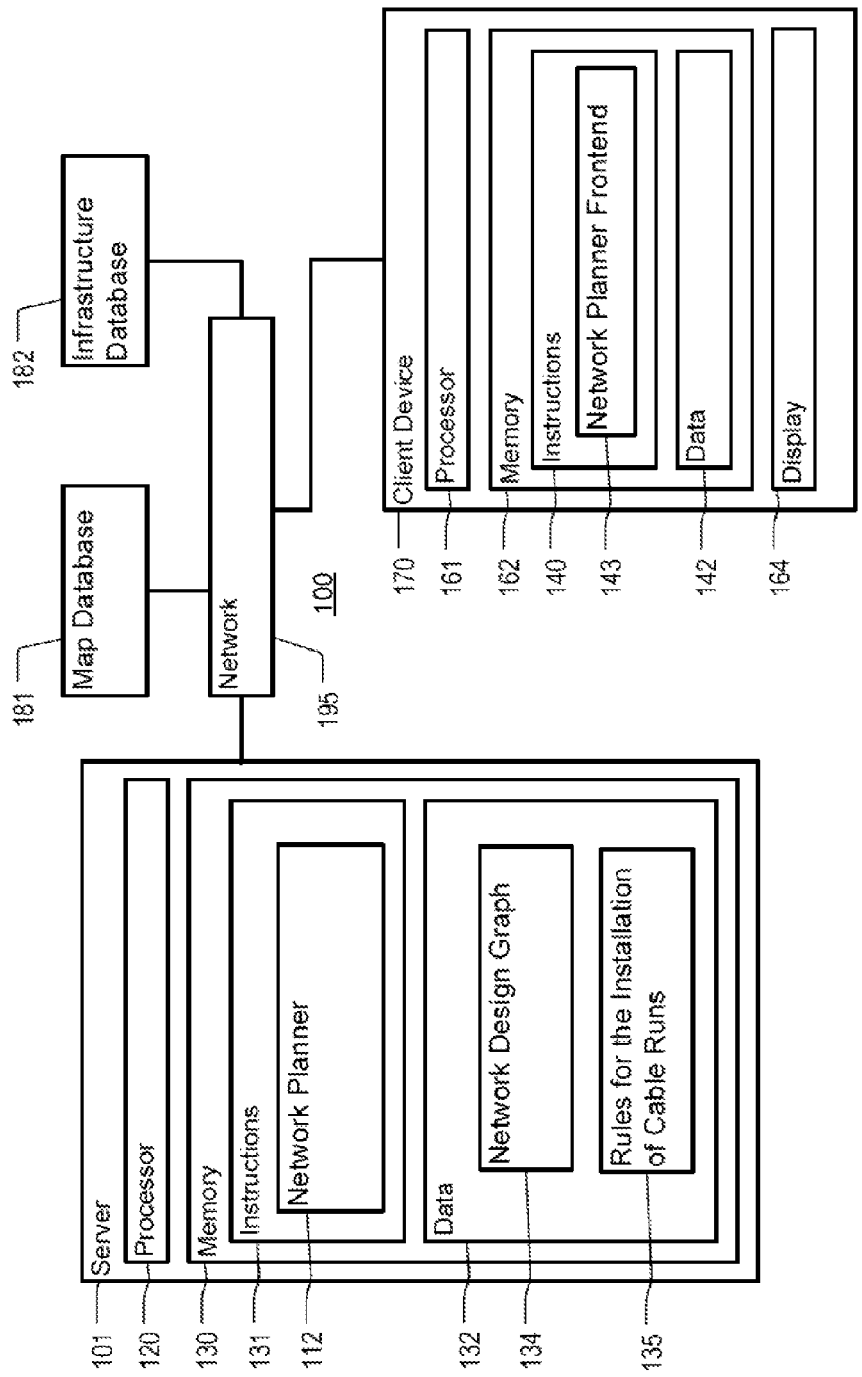
FIG. 1 depicts a schematic diagram of a system.

As shown in FIG. 1, an exemplary system 100 may include computers 101 and 170, map database 181, and infrastructure database 182. Server 101 may contain a processor 120, memory 130 and other components typically present in general purpose computers.

Memory 130 of server 101 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as commercially available processors. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Some of instructions 131 may be part of network planner 112. Network planner 112 is a computer-implemented method for generating a communication network design. The communication network may be a fiber-optic network, copper network, wireless network, and any other type of network. Network planner 112 may determine the location of different network nodes in a particular service area, as well as the cable runs that connect the nodes (if the network is wire-bound). The communications network design may comprise a blueprint of the network design, a profile for the network that is designed, and a bill of materials for it. Network planner 112 may produce comparisons between multiple network designs that show the relative advantages and disadvantages of each design. For example, network planner 112 may estimate the cost of at least some of the materials in the bill of materials in each design and output a comparison of those costs.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, protocol buffers or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer memory chip. Some or all of the instructions and data may be stored in a location physically remote from, yet still accessible by, the processor. Similarly, the processor may actually comprise a collection of processors that may or may not operate in parallel or that may be part of the same cloud computing system.

The server 101 may be at one node of a network 195 and capable of directly and indirectly communicating with other nodes of the network. For example, server 101 may comprise a web server that is capable of communicating with client device 170, map database 181, and infrastructure database 182 via network 195 such that server 101 uses network 195 to transmit and display information on a screen of client device 170. Server 101 may also comprise a plurality of computers, e.g., a load-balanced server farm, that exchange information with different nodes of a network for the purpose of receiving, processing and transmitting data to the client devices. In this instance, the client devices will typically still be at different nodes of the network than any of the computers comprising server 101.

Each client device may be configured similarly to the server 101, with a processor 160, memory 161, instructions 162, and data 140. Some of instructions 162 may be part of frontend 143. Frontend 143 may be a browser-based or standalone application for providing user input to network planner 112 and outputting information that is produced by network planner 112. Frontend 143 interacts with network planner 112 over network 195 to obtain information such as network design diagrams, bills of materials, and other information produced by network planner 112 and display the obtained information to the user of client device 170.

Each client device 170 may be a personal computer, intended for use by a person, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the client device 170 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, netbook, or a cellular phone capable of obtaining information via the Internet. The user may input information, for example, using a small keyboard, a keypad, or a touch screen.

The server 101 and client device 170 are capable of direct and indirect communication, such as over network 195. Although only a few computers are depicted in FIG. 1, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11 standards), and HTTP, and various combinations of the foregoing. Such communication may be facilitated by any device capable of transmitting data to and from other computers, such as modems (e.g., dial-up, cable or fiber-optic) and wireless interfaces.

The server 101 is also capable of direct and indirect communication, such as over network 195, with map database 181 and infrastructure database 182. Map database 181 stores maps that identify house locations, street layouts, intersection locations, geo-coded addresses, and other information that is typically found in a maps or an infrastructure database. Infrastructure database 182 stores information about different infrastructure systems in various populated areas. The stored information may include by way of example maps of water pipe system layouts, electric system layouts, gas system layouts, sewage system layouts, and cable TV layouts. Furthermore, the infrastructure information may identify the location of infrastructure hubs, such as post offices, cell phone towers, water treatment plants, electric distribution stations, satellite downlink stations, and amplification stations. The infrastructure information may comprise maps showing the routings of infrastructure conduits, such as electric lines, electric conduits (e.g., utility poles, underground conduits), water pipes, cable TV lines, telephone lines, gas pipes, sewage pipes, and locations of utility poles.

Although server 101 uses map database 181 and infrastructure database 182 to obtain maps and infrastructure information, other aspects of the system are not limited to this particular arrangement. For example, at least some of the information stored in map database 181 and server database 182 can be stored directly in memory 130, memory 161, on a distributed server, or elsewhere. Moreover, although FIG. 1 depicts network planner 112 as having client-server architecture, other aspects of the system and method are not limited to this particular type of architecture. For example, network planner 112 may be standalone application that comprises the user interface found in frontend 143.

Furthermore, although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single client device having a single processor, various aspects of the system and method may be implemented by a plurality of computers, for example, communicating information over network 195.

Data 132 includes graph 134. Graph 134 is a data structure representing network design 200. Graph 134 includes some or all of the information that is necessary to physically build network design 200, such as locations of nodes and paths taken by the cable runs that connect the nodes. In addition, the graph may include information identifying one or more characteristics of each cable run in network design 200. By way of example, characteristics of each cable run may include length of the cable run, cost to install the cable run, installation technology used to put the cable run in place (e.g., buried installation, aerial installation, installation using underground water/sewer pipe system) type of jacket of the cable, type of cladding of the cable, type of core of the cable, attenuation of the cable, dispersion of the cable, bandwidth of the cable, type of hardware used for installing the cable run and number of hardware used for installation. Although in this example, network design 200 is represented as a graph, other aspects of the system are not limited to this particular data structure. For example, a table, or similar data structure, can be used to store network design 200.

Furthermore, data 132 may include rule database 136. Rule database 136 has one or more rules regarding where cable runs can be installed. The rules may identify types of installation technologies that are acceptable for different stretches of road or another conduit. One rule, for example, may provide that underground cable installation is not allowed on road stretches that are spanning a bridge. Similarly, another rule may provide that cable cannot be installed on private property. In addition to the rules, database 136 may also include information that is used in applying the rules, such as information that identifies road sections that span bridges.

FIG. 2 depicts an example of different maps and diagrams associated with network design 200. Network design 200 is for a network 240 that covers service area 210. Diagram 220 of network 240 is produced by network planner 112. Diagram 220 shows the location of some of the cable runs that constitute network 240. More specifically, in this example, the diagram shows the geographic locations of feeder, distribution, and drop cable runs. The diagram 220 may be produced by superimposing the diagram 230 of network 240 over the map 211 of service area 211. Alternatively, the diagram 220 may be produced by submitting an overlay request to a map server, such as GOOGLE MAPS, and instructing the server to mark portions of the map, as shown by diagram 220, to indicate presence network elements.

Figure 3:
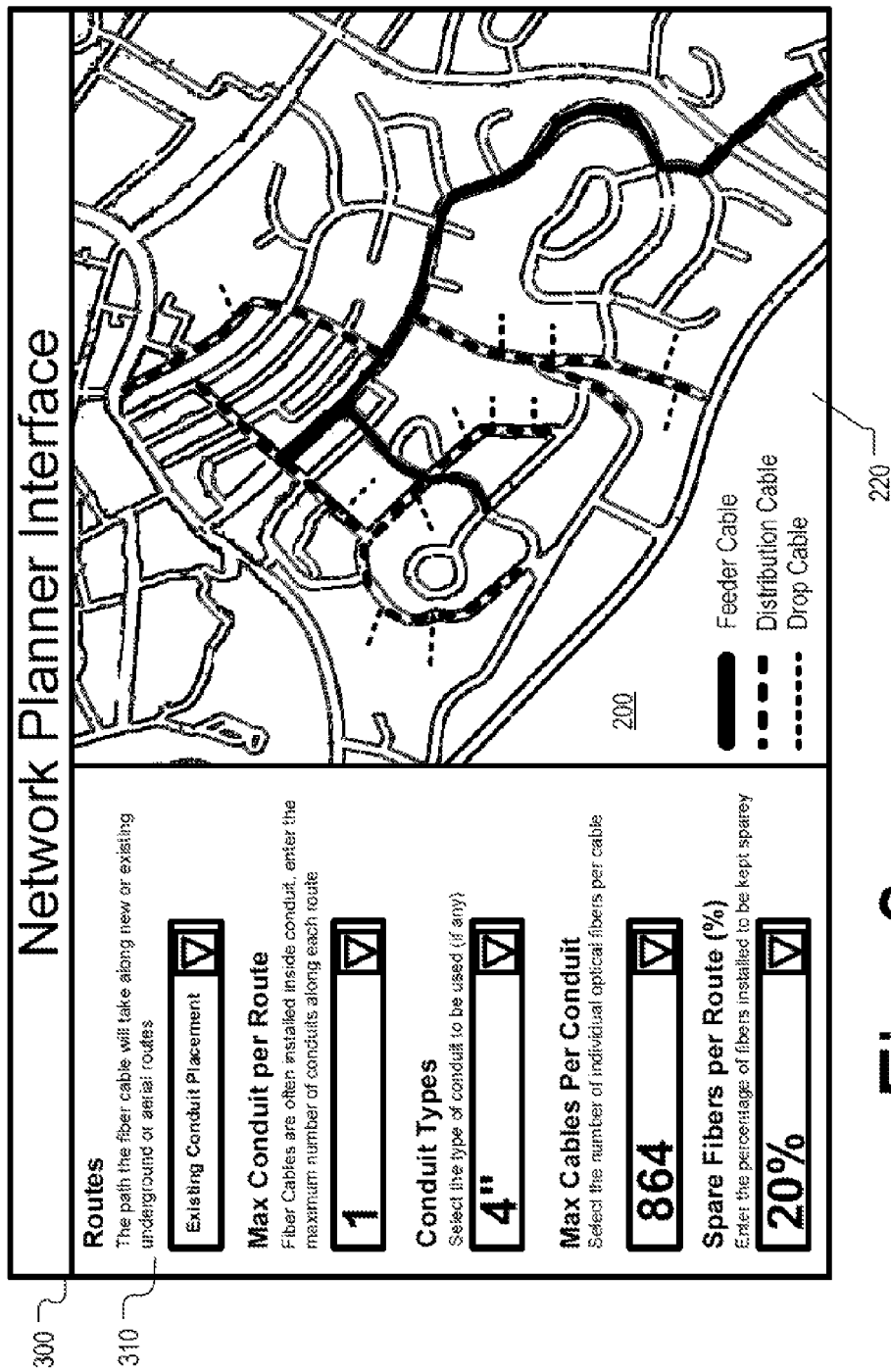
FIG. 3 depicts an example of a graphical user interface (GUI) for a network planner application

FIG. 3 depicts an example of a graphical user interface (GUI) 300 for network planner 112. In the present example, GUI 300 depicts a diagram 220 of network design 200 and includes menu 310 for specifying user preferences for the network design 200. In the present example, menu 310 permits specification of preferences for cable installation technology such as aerial or underground (not shown), conduit types for the cable installation, conduit number, (not shown) maximum cables per conduit, fiber count per cable (not shown), placement of the of the fiber route, and spare capacity.

In some examples, the user may specify colors for specific types of objects depicted in diagram 320. (e.g., feeder cable runs). Moreover, the user may specify a preference for only specific types of network elements to be displayed, such as cable runs using a specific cable installation technology. The requests may be formatted as overlay requests. The overlay requests may be submitted to the framework of a map service such as, GOOGLE MAPS, which retrieves the necessary graphical elements.

Figure 4:
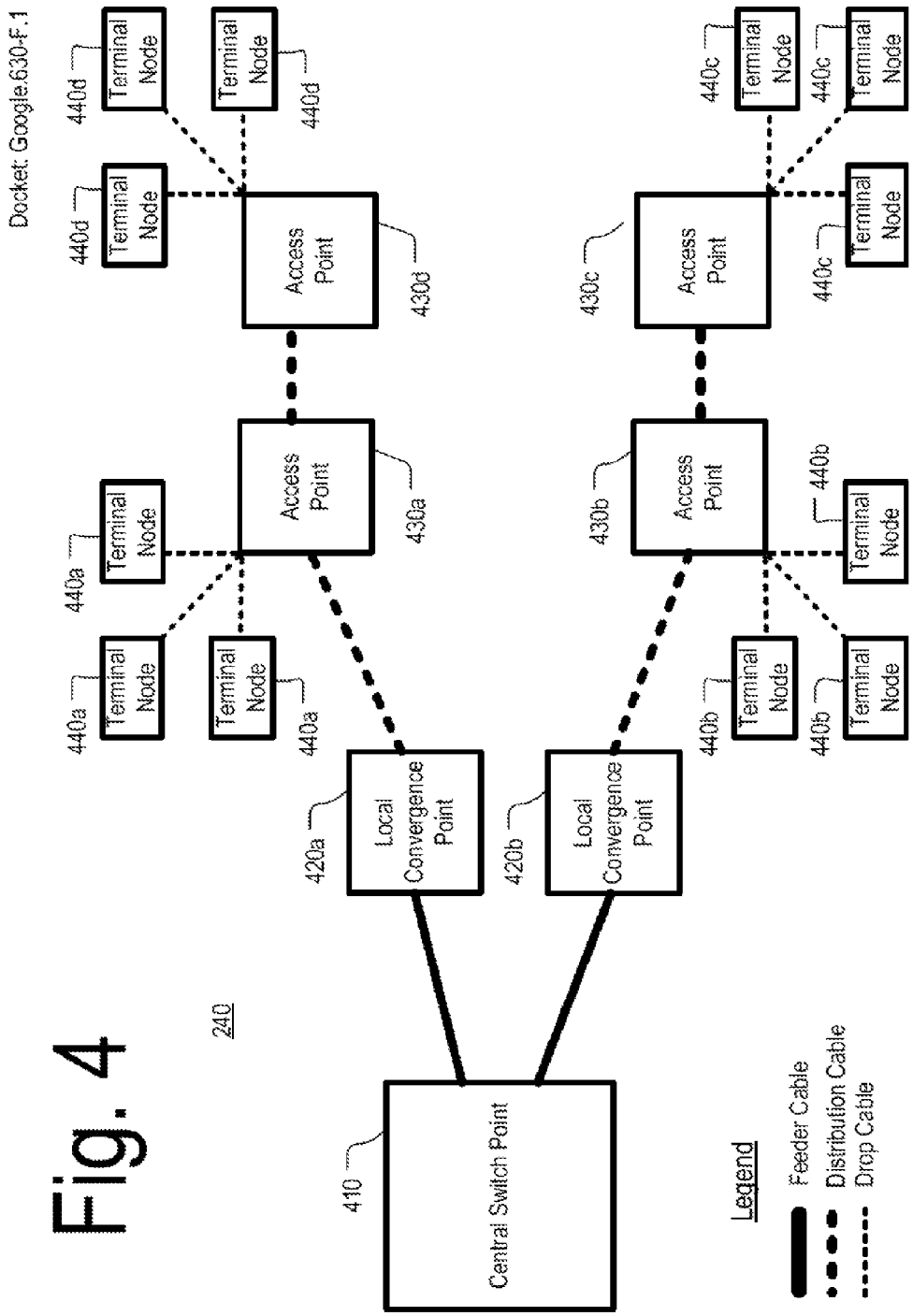
FIG. 4 is a diagram depicting elements of a network.

FIG. 4 is a diagram depicting elements of network 240. In this example, network 240 has hierarchical organization and it uses a local convergence model (LCP) for its topography. Network 240 comprises central switch 410, local convergence points 420*a-b*, access points 430*a-d*, and terminal nodes 440*a-d*. Each of central switch 410, local convergence points 420*a-b*, and access points 440*a-d* may be a passive switch, active switch, or any other type of switching device. Each of terminal nodes 440*a-d* may be endpoint device or a switch. Examples of endpoint devices include modems, television receivers, telephone receivers, and others. Terminal nodes may be placed in user homes or in basements of multi-dwelling units. Although a local convergence model (LCM) topography is depicted, network planner 112 is not limited to using only this type of topography in the network designs that it generates.

The cable run(s) connecting central switch point 410 with local convergence points 420*a-b* may be feeder cable runs. The cable run(s) connecting the different access points may be distribution cable runs. The cable runs connecting the home terminals to the access points may be cable drops. Feeder runs, distribution runs, and cable drops may be different from one another in various physical characteristics, such as number of cables per run, number of fibers per cable, type of jacket, type of cladding, type of core, attenuation, dispersion, bandwidth, and/or brand. The type of cable for each cable run may be automatically selected by network planner 112 or specified by the user.

Figure 5:
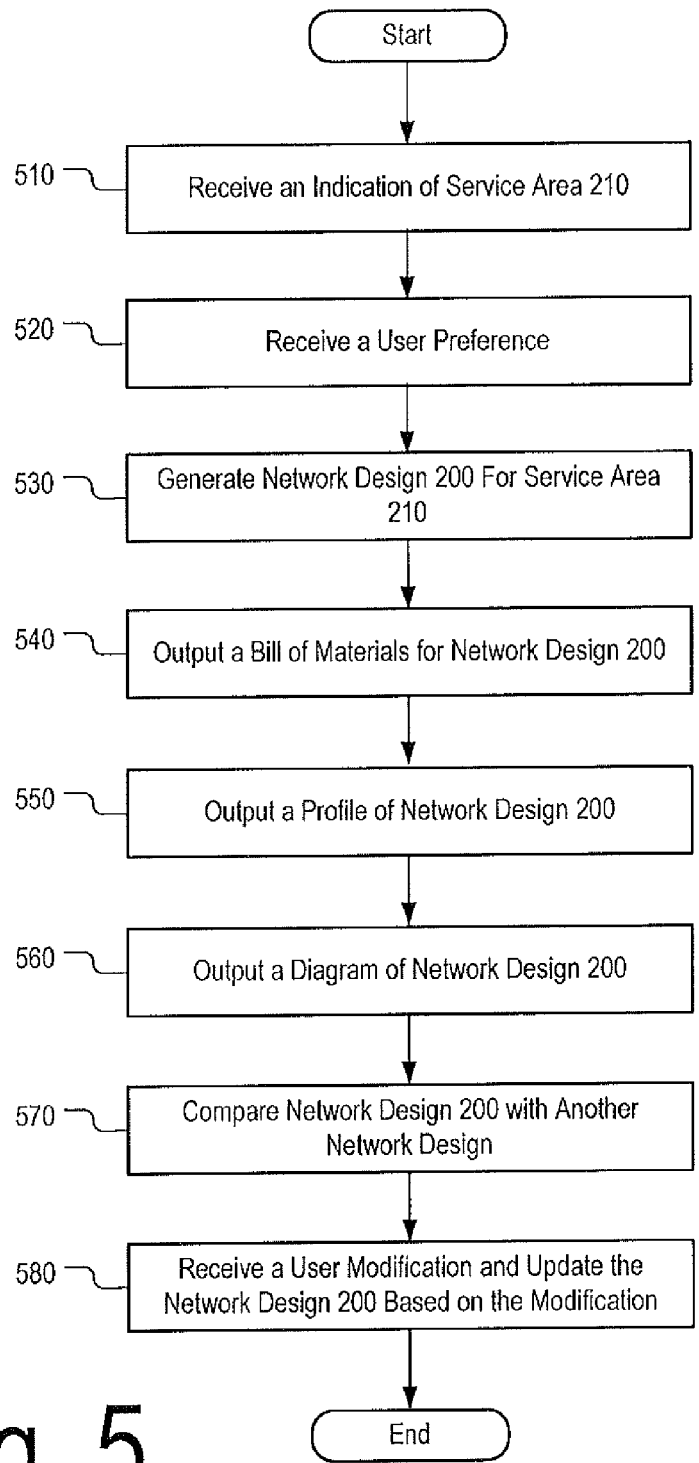
FIG. 5 depicts a flowchart of a process performed by a network planner application.

FIG. 5 depicts a schematic diagram of a process performed by network planner 112.

At task 510, an indication of service area 210 is received. The indication may be a name of a municipality (e.g., a town, a city, a town section, a neighborhood), or an indication of a geographic perimeter (e.g., coordinates, dimensions). The service area may be selected by the user graphically by drawing an indication of a perimeter (e.g., an ellipsoid, a polygon) over a rendition of a map.

At task 520, an indication of at least one user preference for network 240 is received. The user preference may specify one or more desired characteristics of the network 240 such as a type of network layout, maximum number of access points, maximum number of passive splitters, maximum number of cables per conduit, and amount of spare capacity. Furthermore, the preference indication may be related to an economic metric of the network, such as deployment cost, operational cost, and scaling cost.

At task 530, a network design 200 is generated for the service area 210. In generating the network design 200, network planner 112 determines the locations of each node in the network (e.g., a street address, geographic coordinates). Furthermore, in generating the network design 200, network planner 112 determines the paths taken by the cables connecting the nodes of network 240.

At task 540, a bill of materials for the network design is output. The bill of materials can be presented in the form of an EXCEL spreadsheet or any other format. The generated bill of materials may include any information that is typically found in bills of materials, such as engineering bills of materials and sales bills of materials. It may list components, assemblies, sub-assemblies, and quantities of each, needed to put the designed network in place. Moreover, the bill of materials may be organized in a per-cluster fashion thereby listing components, assemblies, sub-assemblies, and quantities of each, needed to put individual clusters of the designed network in place. Upon obtaining the bill of materials from the network planner application, a user can take this document to different vendors and solicit bids.

At task 550, a profile of network design 200 is presented that provides information about technical and economic characteristics of network design 200. Examples of such characteristics include number of households covered, cost per household covered, deployment cost, and projected deployment cost.

At task 560, diagram 220 for network design 200 is output. The diagram may include a map of the service area 210 identifying the locations of network nodes and cable runs connecting the nodes. Moreover, the diagram may provide any other information that is typically found in network design diagrams such as type and model number of different nodes, type of cable used for different cable runs. Task 560 is further described in the discussion with respect to FIG. 12.

At task 570, a comparison between the network design 200 and another network design is output. The other network design may be based on a different set of user preferences than the first network design. In comparing the two network designs, information about the network designs is presented in a manner that enables the user to easily identify differences between the two designs. For example, a profile for network design 200 may be displayed side by side with a profile for the other network design. Similarly, the bills of materials, or parts thereof, for the two designs may by presented side by side, thereby advantageously presenting the user with an opportunity to weigh the merits of the two network designs.

At task 580, the network design 200 is updated based on a user-input modification. Task 580 is further described in the discussion with respect to FIG. 14.

Figure 6:
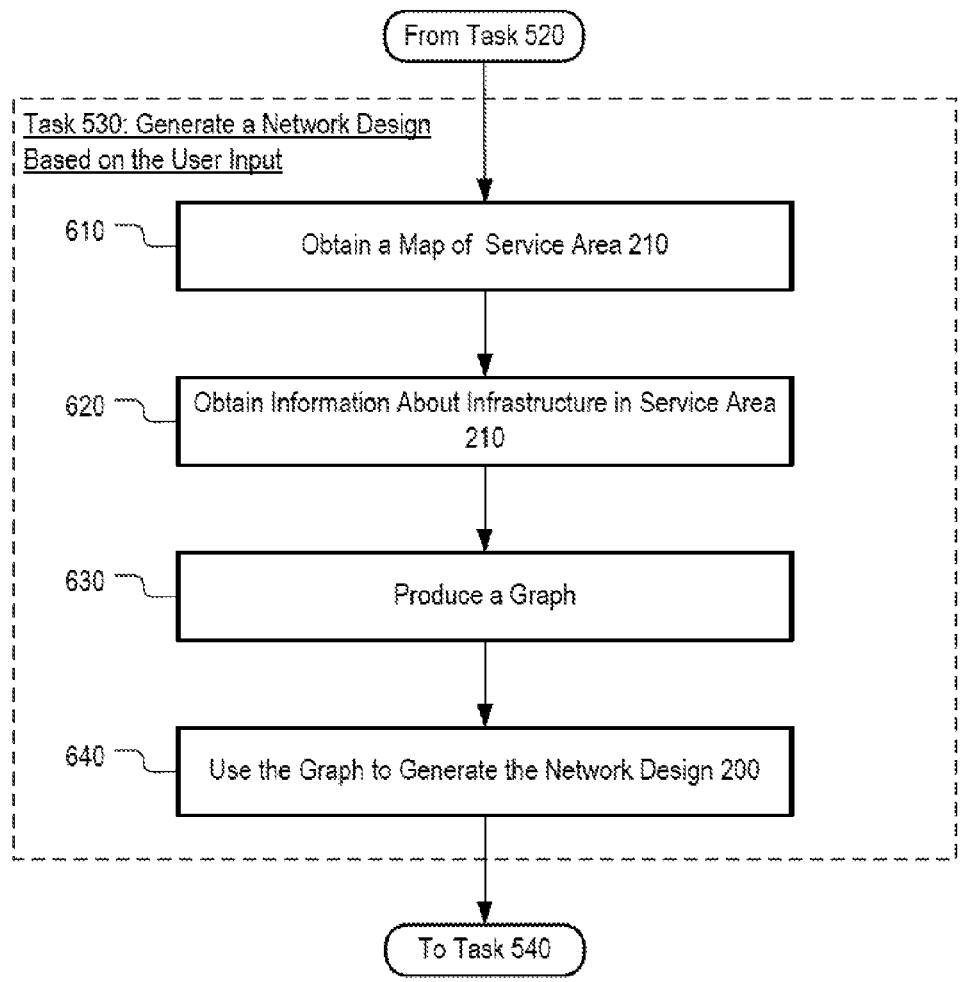
FIG. 6 depicts a flowchart of subtasks associated with FIG. 5.

FIG. 6 depicts a flowchart of subtasks associated with the generating network design 200 for the service area 210 as shown by task 530 in FIG. 5. In this example, task 530 includes the following subtasks: obtaining a map of the service area (610), obtaining information about infrastructure system(s) in the service area (620), producing graph 134 (630), and generating a network design based on graph 134 (640).

At task 610, a map of service area 210 is obtained. The map may identify the location of houses and other buildings in the service area, street layouts (including street intersections), and topographic features such as streams, rivers, water bodies, and hills. The map may be obtained from map database 181 or from map services, such as, GOOGLE MAPS.

At task 620, information about infrastructure system(s) in the service area 210 is obtained. The infrastructure information may be provided as user input or it may be obtained from infrastructure database 182. The infrastructure information could be maps of water pipe system layouts, electric system layouts, gas system layouts, sewage system layouts, and cable TV system layout. The infrastructure information may identify the location of infrastructure hubs such as post offices, cell phone towers, water treatment plants, electric distribution stations, satellite downlink stations, and amplification stations. Furthermore, the infrastructure information may identify the layout of infrastructure conduits such as electric lines, electric conduits (e.g., utility poles, underground conduits), water pipes, cable TV lines, telephone lines, gas pipes, water pipes, sewage pipes, and locations of utility poles.

At task 630, graph 134 is produced. The graph 134 may be produced based on at least some of the information obtained at tasks 610 and 620. In producing the graph, information about road locations, street intersections, and geo-coded addresses may be extracted from the map obtained at task 610 and used in building the graph. The nodes in the graph may correspond to different street intersections in service area 210. Moreover, nodes in the graph may correspond to infrastructure hubs, houses, and apartment buildings. The edges in the graphs may correspond to sections of roads, water pipes, utility poles that connect the nodes, and other types of infrastructure conduits. For example, if two nodes in the graph 134 correspond to neighboring houses, an edge in the graph 134 may correspond to the street section connecting the two houses, utility cable between the two houses, or water piping that connects the houses.

Each node in the graph may be associated with a geographic location. Accordingly, the graph may contain information identifying geographic coordinates associated with the different nodes (e.g., geographic coordinates of homes and infrastructure hubs). Moreover, the graph may include identifiers, such as cost identifiers, associated with different edges in the graph.

At task 640, network design 200 is generated based on graph 134. The generation of network design 200, by network planner 112, may include determining where the network nodes that constitute network 240 will be placed and calculating cable runs that connect the nodes. Furthermore, the generation of network design 200 may include modifying graph 134 to include information that is necessary to physically build network design 200. Such information may include locations of network nodes, paths taken by cable runs, cable types for different cable runs, installation methods for different cable runs, and model numbers of different network nodes.

Because service area 210 may comprise thousands of homes, generating network design 200 may be computationally intensive. To manage the problem's scale, network planner 112 may group network nodes into clusters and compute the cable runs for each cluster separately from the other clusters; then network planner 112 defines clusters of clusters and computes the cable runs for them as well.

Figure 7:
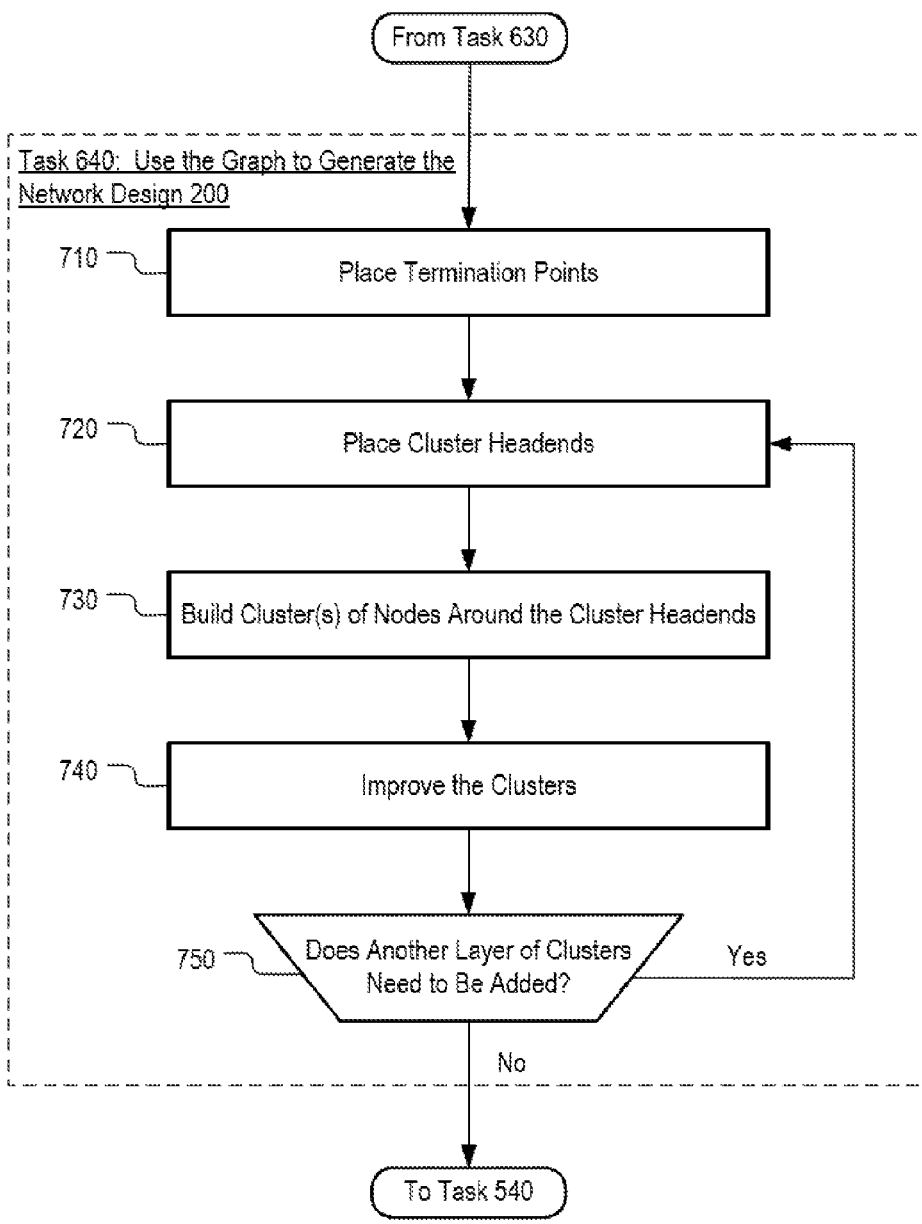
FIG. 7 depicts a flowchart of subtasks associated with FIG. 6.

FIG. 7 depicts a flowchart of the subtasks associated with generating the network design 200 based on graph 134 as shown by task 640. In one example, task 640 includes the following subtasks: placing terminal nodes (710), placing cluster centers (720), building clusters around the centers (730), improving the clusters (740), and determining if another level of clusters needs to be added (750).

At task 710, terminal nodes are placed in network design 200. The placing of terminal nodes involves determining the location and number of terminal nodes that are going to be present in network 240. For example, terminal nodes can be placed at each household in the service area 210 or at a subset of all households. Alternatively, there may be multiple terminal nodes per house. For example, there may be a terminal node per bedroom as determined from housing plans found in map database 182. The placing of terminal elements may involve modifying graph 134 so that some of its nodes are identified as being associated with terminal nodes.

At task 720, cluster centers are placed in the network design 200. A cluster center may be a node in a cluster that is situated on a communication path between each of the remaining nodes in the cluster and a node that is not part of the cluster. For example, access point 430b may be viewed as a center of the cluster of terminal nodes 440b.

The placing of cluster centers may involve choosing the quantity, location, and hardware for a set of cluster centers. Furthermore, the placing of cluster centers may involve modifying graph 134 so that some of its nodes or edges are identified as being associated with cluster centers.

Regarding location, the cluster centers may be placed at random or pseudorandom street intersections in the service area 210. For example, the cluster centers can be placed in such a way that they are situated at different street intersections and distributed approximately uniformly across the service area.

Regarding choice of hardware, the cluster centers may be any type of active or passive switching device. Network planner 112 may automatically select the hardware for each cluster center based on a variety of considerations, such as spare capacity needed, cost, technologies used by the network design, and technology used by the cluster centers. Moreover, the hardware for the cluster centers may be selected based on user preferences, such as preferences pertaining to cost, network layout, network technologies, spare capacity, manufacturer name, and model number.

Regarding the quantity of cluster centers, network planner 112 may choose to use any number of cluster centers depending on a variety of considerations such as network topology used in network design 200, cost, and spare capacity needed. Furthermore, the quantity of cluster centers used may depend on at least one of the user preferences received at task 520.

At task 730, clusters of nodes are built around the cluster centers placed at task 720. The manner in which each individual cluster is built is further described in the discussion with respect to FIG. 9.

At task 740, the clusters of nodes are improved. In some aspects, the clusters of nodes may be improved by shifting the position of a cluster center within the cluster as described in the discussion with respect to task 840. In another aspect, task 740 may be performed by executing at least some of the tasks described in the discussion with respect to FIGS. 10-11.

At task 750, it is determined whether another layer of clusters needs to be added. Upon a positive determination, tasks 720-750 are repeated again. In subsequent iterations, the cluster centers from the preceding iteration are clustered. By executing tasks 720-740 repeatedly, a hierarchy of layers is established. Network 240, in one example, has a three-layer hierarchy. The first layer of clusters includes terminal nodes 440a-d as nodes, and access points 430a-d as cluster centers. The second layer of clusters includes access points 430a-d as nodes and local convergence points 420a-b as cluster centers. The third layer of clusters includes local convergence points 420a-b as nodes and central switch point 410 as a cluster center.

The number of layers present in network design 200 may be based on a preset goal for the design's hierarchical depth. The goal may be specified in one of the user preferences received at task 520 or it can be determined automatically by network planner 112 in accordance with design considerations such as cost, efficiency, and dependability.

Figure 8:
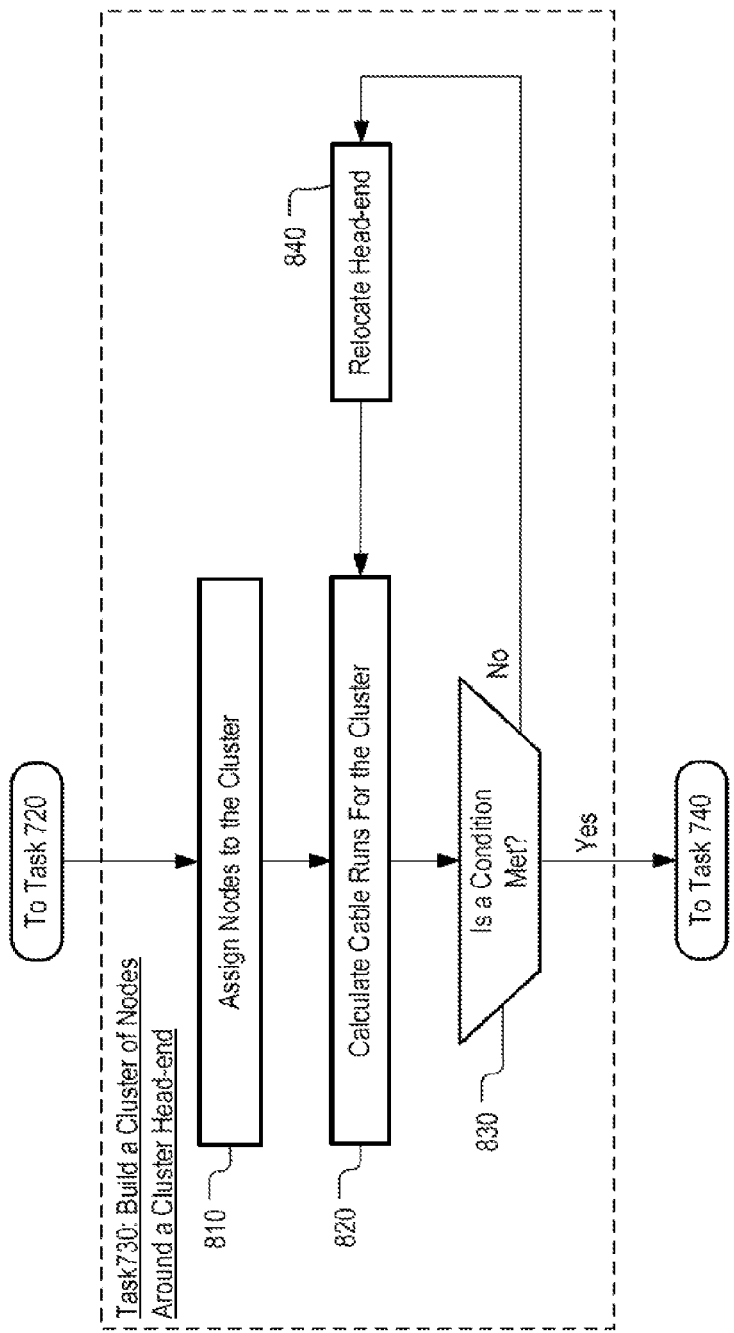
FIG. 8 depicts a flowchart of the subtasks associated with the clustering of nodes.

FIG. 8 depicts a flowchart of the subtasks associated with building a cluster of nodes around the cluster centers as shown by task 730 in FIG. 7. The process of FIG. 8 relates to the building of a cluster of nodes around an individual cluster center. Thus, to execute task 730, the process of FIG. 8 may be repeated multiple times. In this example, task 730 involves: assigning nodes to a cluster (810), computing cable runs for the cluster (820), determining if a condition is met (830), and repositioning the cluster center when the condition is not met (840).

At task 810, a set of nodes is assigned to the cluster. The nodes may be assigned based on distance to the cluster center. The distance may be a Euclidean distance or road distance (e.g. distance that one needs to travel alongside roads or another conduit in the service area to reach the cluster center from the node). In one aspect, a node is assigned to the cluster whose center is the closest of all other cluster centers to the node.

Furthermore, in some aspects nodes may be assigned to a cluster based on criteria other than distance. For example, the assignments may be made based on cost of laying cable between the cluster center and a node, type of conduit available between the cluster center and a node, and so forth. In that regard, the notion of distance may be expended beyond the realm of special separation into the sphere of monetary and engineering considerations.

At task 820, cable runs for the cluster are calculated. Calculating the cable runs may involve modifying graph 134 to contain indications of the routes taken by different cable runs. Task 820 is further described in the discussion with respect to FIG. 9.

At task 830, it is determined whether network design 200 satisfies a predetermined condition when the cluster center is situated at the location determined at task 720. If the predetermined condition is not satisfied, the cluster center is relocated. The predetermined condition may pertain to cost, equipment usage, or amount of infrastructure work performed. As one example, the condition may be that the deployment cost of the cluster does not exceed a specific dollar amount (e.g., 10,000 dollars). As another example, the condition may be that the no more than a specific quantity of installation hardware is used in the cluster (e.g., 1,000 cable clips).

At task 840, the location of the cluster center is changed from a first location to a second location. The second location may be selected at random, or it may be selected based on a selection criterion. In one example, the second location is selected so as to minimize the sum of distances between the cluster center node and each of the other nodes in the cluster. As another example, the second location may be selected based on its proximity to the location of an infrastructure hub (e.g., electric distribution hub, water distribution hub). For example, the second location may be selected so that the cluster center is located within a specific distance from the infrastructure hub (e.g., 0 meters, 1 meter, 5 meters). Co-locating the cluster centers with other infrastructure hubs may be advantageous because, oftentimes, cable(s) for network 240 may be laid alongside existing infrastructure. For example, the cable(s) can be run on shared utility poles or in trenches that are used by some other type of municipal infrastructure.

Figure 9:
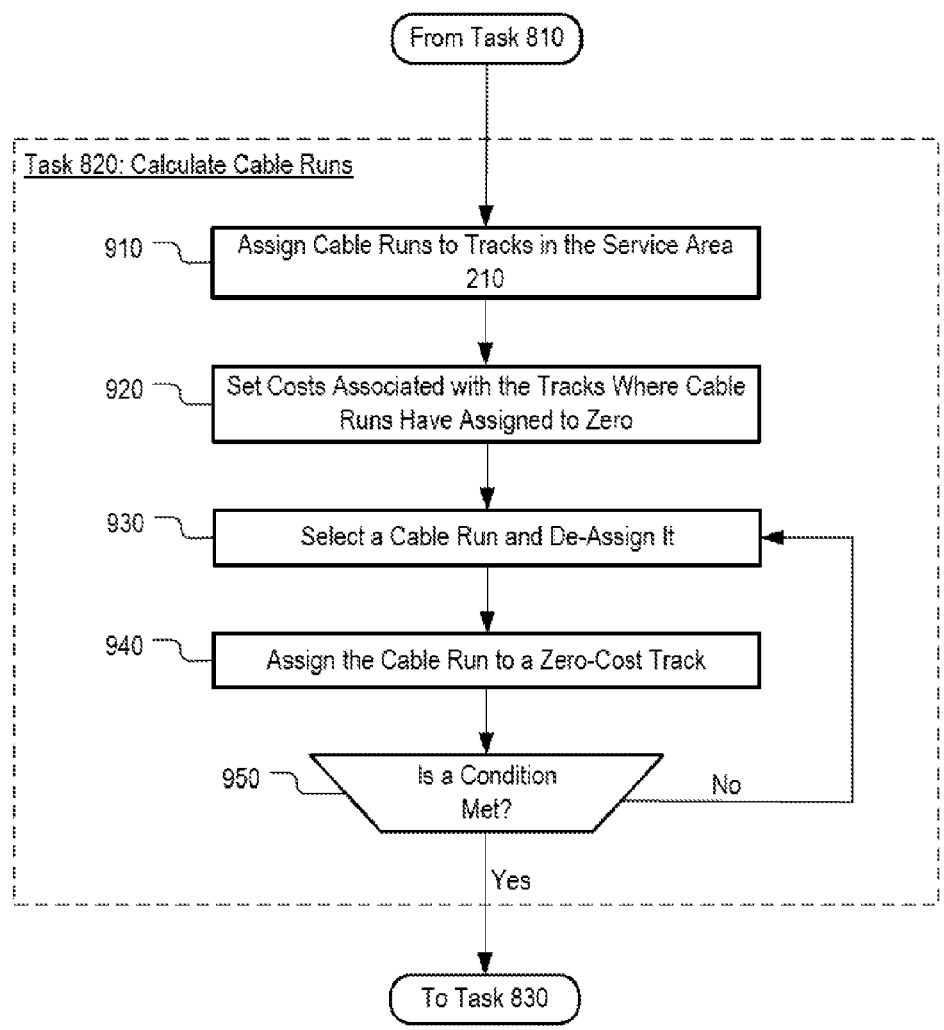
FIG. 9 depicts a flowchart of subtasks associated with FIG. 8.

FIG. 9 depicts a flowchart of the subtasks associated with computing the cable runs for a cluster as shown by task 820 of FIG. 8. In this example, task 820 includes the following subtasks: assigning cable runs to tracks (910), setting to zero costs associated with the tracks to which cables have been assigned (920), selecting a cable run for reassigning (930), assigning the selected cable run to another track (940), and determining if a condition is met (950).

At task 910, cable runs for a cluster are determined. Each cable run connects a node to its cluster's centers. Task 910 involves assigning each cable run to a track in service area 210. A track may include one or more edges in the graph 134 that connect nodes from the cluster. The assignment of each cable run to a track may involve modifying graph 134 to include an indication of the path along which the cable run is installed in service area 210.

The assignment of cable runs to tracks may be performed by analyzing the graph 134. As noted above, the nodes of graph 134 may correspond to cluster nodes and cluster centers. At the same time, the graph nodes may also correspond to houses and street intersections. Furthermore, the edges that connect the nodes of graph 134 may correspond to sections of infrastructure conduits (e.g., street sections, cable sections, stretches of utility poles) that connect the nodes. Thus, to determine the track that connects two graph nodes (that correspond to a cluster node and a cluster center), one can use a graph search algorithm (e.g., shortest path) and follow the edges connecting the different nodes in the graph.

For example, first node in the graph 134 may correspond to a house where a network endpoint (e.g., a modem) is located, and a second node may correspond to an intersection on the street where the house is located, wherein another network node (e.g., a router) is located at the intersection. Thus, in this example, the first graph node is associated with a cluster node whereas the second graph node is associated with a cluster center. To reach the cluster center from the cluster node, under most circumstances, one could run a cable along the street from the house (where the cluster node is located) to the intersection (assigned to the cluster center). Thus, a cable run could be assigned to an edge that connects the node in graph 134 that corresponds to the cluster center and the node in graph 134 that corresponds to the cluster node (and the house.)

Despite its efficiency, the above approach may result in erroneous assignments of cable runs. For example, if the house and the intersection are located on different sides of a large highway, it may be impossible to run a cable across the highway. In such instance, the cable run may have to be installed along a circuitous route that takes an overpass or bridge over the highway. In one aspect, network planner 112 may handle such errors by examining each cable run in the network design 200, after it has been assigned to a track in the graph 134, and determining whether the assignment is correct. The examination may be performed in accordance with the rules stored in database 165. If errors are detected, they are indicated to the user when a diagram for the network design 200 is displayed. For example, cable runs that are illegal may be displayed in a different color, such as red. The user in turn, is given the opportunity to correct the error by choosing an alternative route for the cable run. The error verification and submission of user corrections are further described in the discussions with respect to FIGS. 13 and 14.

In addition to assigning cable runs to different tracks, at task 910, one or more characteristics of each cable run may be determined (e.g., installation technology, cable type). For example, the physical characteristics may be chosen, such as number of cables per run, number of fibers per cable, type of jacket, type of cladding, type of core, attenuation, dispersion, bandwidth, and/or brand. As another example, characteristics of the installation technology used to install the cable run may include type of installation technology such as aerial or underground (not shown), conduit types for the cable installation, conduit number, (not shown). The cable and installation characteristics may be specified by the user or automatically selected by the network planner 112 in order for a specific goal (e.g., cost) to be met.

For example, at task 910, a cable run may be assigned for each node in the cluster so that the assigned cable run connects that node to the cluster's center. Each cable run is assigned to a specific track. The track may lie on the shortest path between a node and the cluster's center. Alternatively, the track may be coincident with a path used by existing infrastructure (e.g., roads, electric lines). For instance, if the track of a cable run is coincident with the path of an electric line, then the cable run can be installed on utility poles on the side of the road or in pre-existing electric conduits.

At task 920, paths in graph 134 are identified. The identified graph paths correspond to tracks in service area 210 to which cable runs have been assigned. Once the graph paths are identified, the values of identifiers associated with the graph paths (e.g., cost identifiers) are modified. The modification may involve setting each identifier from a first value to a second value. In the example of FIG. 9, the identifiers may be set to equal zero or some other value based on the cables run down the identifiers' cable paths.

At task 930 a cable run is selected for reassigning. The cable run may be selected randomly or based on a selection criterion. For example, the cable run may be selected for reassignment based on its length or deployment cost. Moreover, the cable run may be selected for reassignment based on its track not being coincident with a path taken by existing infrastructure. When the cable run is reassigned from its current track, the identifier associated with the track in graph 134 may be set back to its original value.

At task 940, the unassigned cable run selected for reassignment is assigned to a recipient track. When the cable run is assigned to the recipient track, at least some the cable that is part of the cable run is set to run along the recipient track. The recipient track may be selected to receive the cable run based on its cost. For example, the recipient track may be selected because it is a zero cost track (e.g. the identifier associated with the graph path corresponding to the recipient track is equal to zero). Moreover, the recipient track may be selected to receive the unassigned routing because it is coincident a path taken by existing infrastructure, such as electric lines, roads, and water pipes.

Executing task 940 may result in two cable runs being assigned to the same track. The rationale for doing so is that most of the expense associated with installing cable often relates to providing the support infrastructure for the cable, such as digging trenches, setting up utility poles, and so forth. Once the support infrastructure for a specific track is provided, the cost of running another cable along that track is often minimal. For example, once a trench is excavated, the cost of placing additional cables inside the trench may be negligible when compared to the initial expense of excavating the trench.

At task 950, it is determined whether network design 200 meets a predetermined condition. If the predetermined condition is not satisfied, task 950 is repeated (for the same cable run or for another one). The predetermined condition may pertain to cost, equipment usage, or amount of infrastructure work performed. As one example, the condition may be that the cost for deploying the cable runs for the cluster does not exceed a specific dollar amount (e.g., 10,000 dollars). As another example, the condition may be that the no more than a specific quantity of installation hardware is used (e.g., 1,000 cable clips). As yet another example, the condition may be that the total length of trenches that need to be excavated in order to install the cables of the cluster does not exceed a limit (e.g., 3000 meters).

Figure 10:
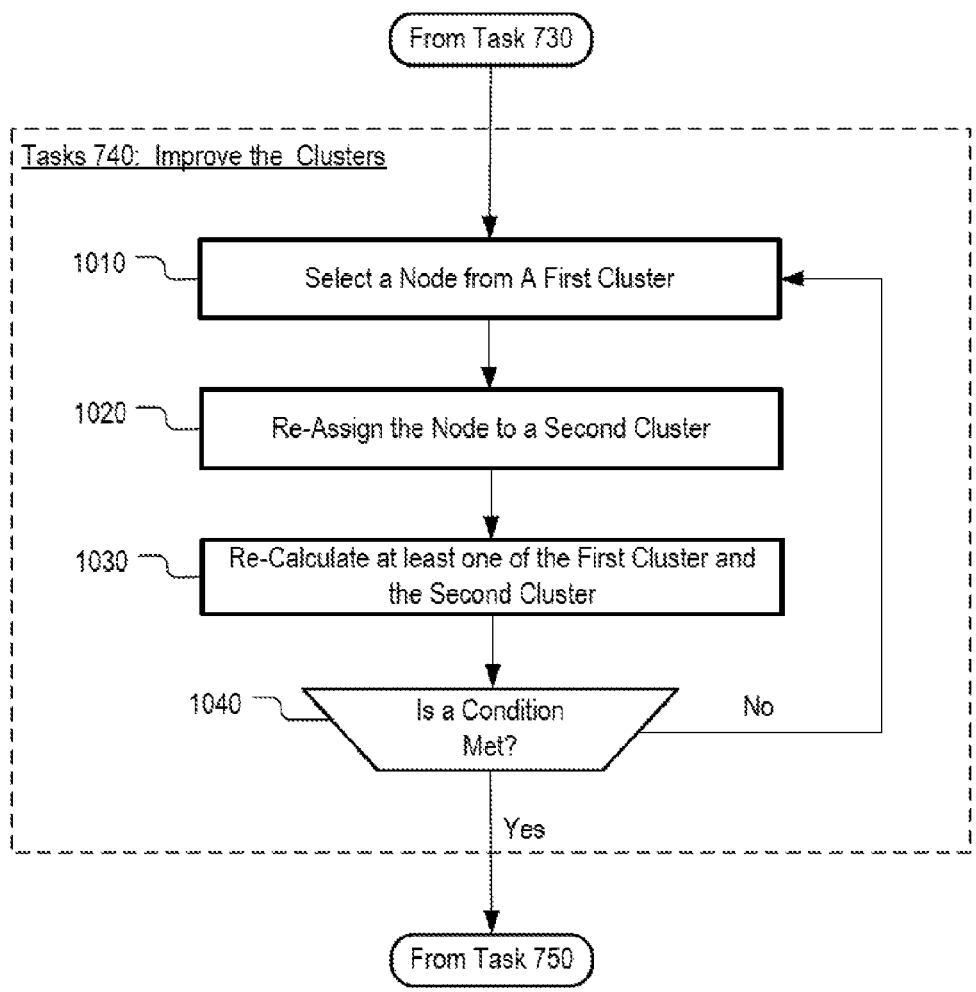
FIG. 10 depicts a flowchart of subtasks associated with FIG. 7.

FIG. 10 depicts a flowchart of the subtasks associated with improving the clusters in network design 200 as shown by task 740 of FIG. 7. In this example, task 740 includes the following subtasks: selecting a node from a first cluster (1010), reassigning the node to a second cluster (1020), recalculating the first and second clusters (1030), and determining whether a condition is met (1040).

At task 1010, a node from a first cluster is selected. The node may be selected at random or based on a selection criterion. The selection criterion may be, for example, based on distance between the node and the first cluster's center, a cost associated with the first node (e.g., deployment or operational cost), cost associated with the installation of cable between the first node and the center of the first cluster (e.g., deployment or operational cost).

At task 1020, the node is unassigned from the first cluster and assigned to a second cluster. The second cluster may be selected as a recipient of the first node at random or based on a selection criterion. The selection criterion may be based on distance between the node and the second cluster's center or number of nodes present in the second cluster.

At task 1030, the first and second clusters are recalculated. Task 1030 entails repeating at least some of tasks 820-840 with respect to the first and second clusters.

At task 1040, it is determined whether network design 200 satisfies a predetermined condition when the first node is assigned to the second cluster. If the predetermined condition is not satisfied, tasks 1010-1030 are repeated and a node is moved again from one cluster to another. The predetermined condition may pertain to cost, equipment usage, or amount of infrastructure work performed. As one example, the condition may be that the deployment cost of the second cluster does not exceed a specific dollar amount (e.g., 10000 dollars). As another example, the condition may be that the no more than a specific quantity of installation hardware is used for the second cluster (e.g., 1000 cable clips). As yet another example, the condition may be that the total length of trenches that need to be excavated in order to install the cables of the first cluster does not exceed a limit (e.g., 3000 meters).

Figure 11:
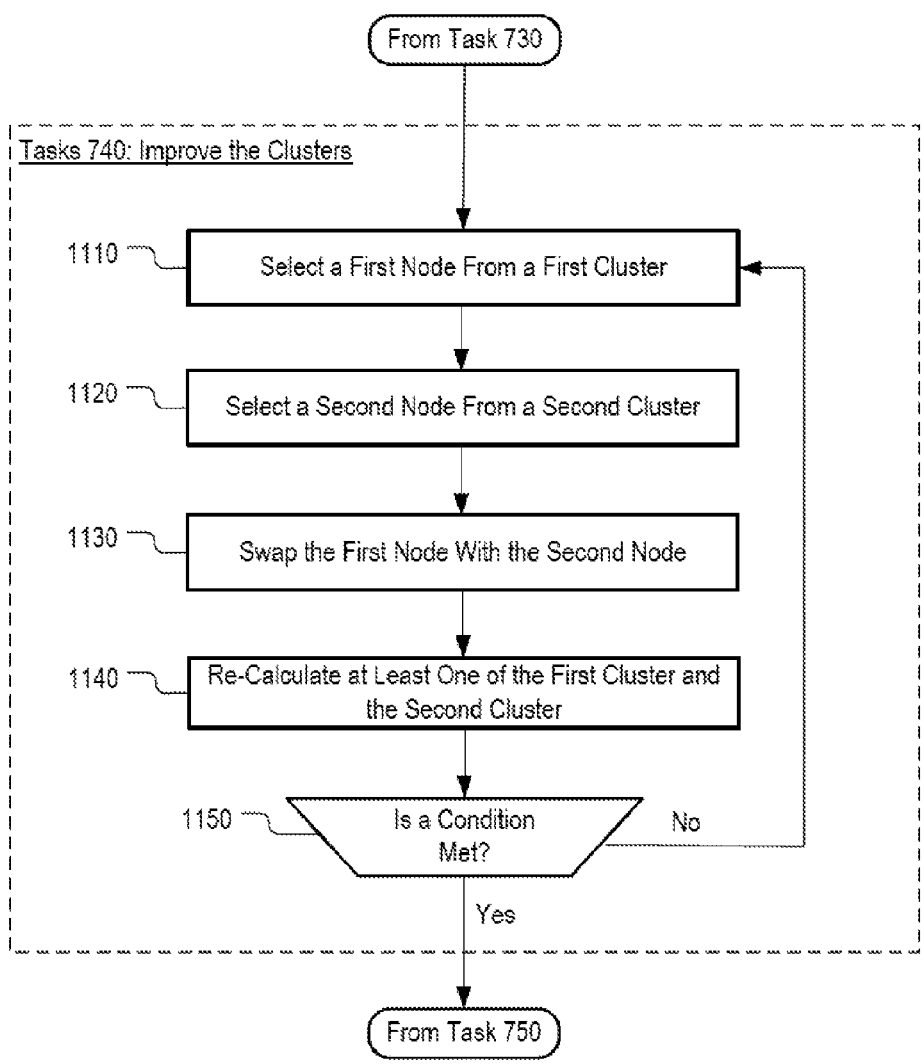
FIG. 11 depicts another flowchart of subtasks associated with FIG. 7.

FIG. 11 depicts a flowchart of the subtasks associated with improving the clusters in network design 200. In accordance with one example, task 740 includes the following subtasks: selecting a first node from a first cluster (1110), selecting a second node from a second cluster (1120), swapping the first node with the second node (1130), recalculating the first and second clusters (1140), and determining whether a condition is met (1150).

At task 1110, a first node from a first cluster is selected. The first node may be selected at random or based on a selection criterion. The selection criterion may be, for example, based on distance between the first node and the center of the first cluster, a cost associated with the first node (e.g., deployment or operational cost), cost associated with the installation of cable between the first node and the center of the first cluster (e.g., deployment or operational cost).

At task 1120, a second node from a second cluster is selected. The second node may be selected at random or based on a selection criterion. The selection criterion may be, for example, based on distance between the second node and the center of the second cluster, a cost associated with the second node (e.g., deployment or operational cost), cost associated with the installation of cable between the second node and the center of the second cluster (e.g., deployment or operational cost).

At task 1130, the first and second nodes are swapped. The first node is unassigned from the first cluster and assigned to the second cluster, whereas the second node is unassigned from the second cluster and assigned to the first cluster.

At task 1140 the first and second clusters are recalculated. Task 1140 entails repeating at least some of tasks 820-840 with respect to the first and second clusters.

At task 1150, it is determined whether network design 200 satisfies a predetermined condition when the first node is assigned to the second cluster and the second node is assigned to the first cluster. If the condition is not satisfied, tasks 1110-1140 are repeated and another node swap is performed. The condition may pertain to the network design as a whole or to clusters in their individual capacity. In particular, the condition may pertain to cost, equipment usage, or amount of infrastructure work performed. As one example, the condition may be that the deployment cost of the first cluster does not exceed a specific dollar amount (e.g., 10000 dollars). As another example, the condition may be that the no more than a specific quantity of installation hardware is used for the first cluster (e.g., 1000 cable clips). As yet another example, the condition may be that the total length of trenches that need to be excavated in order to install the cables of the first cluster does not exceed a limit (e.g., 3000 meters).

Figure 12:
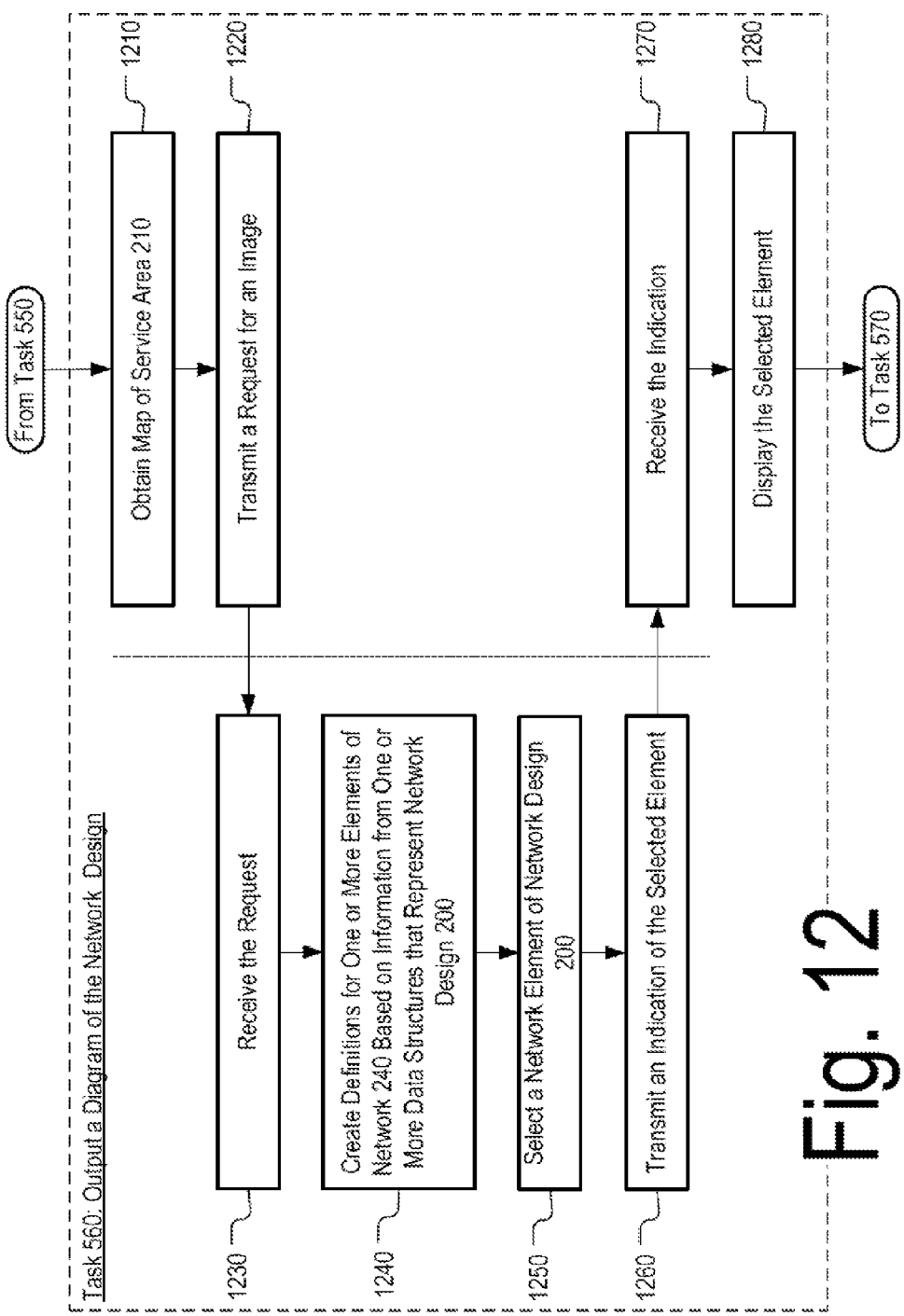
FIG. 12 depicts a flowchart of subtasks associated with FIG. 5.

FIG. 12 depicts a flowchart of the subtasks associated with outputting a diagram of network design 200 as shown by task 560 of FIG. 5. In this example, task 560 includes the following subtasks: obtaining a map (1210), transmitting a request for a diagram associated with the network design 200 (1220), receiving the request (1230), creating definitions for elements of the network 240 (1240), selecting an element of the network 240 (1250), transmitting an indication of the selected element (1260), receiving the indication (1270), and displaying the selected element (1280).

At task 1210, client device 170 obtains a map of at least part of the service area covered by network design 200. The map may be obtained from a public map service, such as GOOGLE MAPS, YAHOO MAPS, and MAPQUEST, or it can be obtained from a private server.

At task 1220, client device 170 transmits a request for a diagram that is associated with network design 200. The request may be for a diagram covering the whole service area 210 (e.g., diagram 220) or a section of the area (e.g., the 221). When diagram 220 is displayed in a tiled fashion, all tiles may be requested at once or multiple requests can be issued, each request specifying an individual tile.

The transmitted request may include additional information such as an indication of a scale (e.g., scale of map 210, scale of diagram 230), indication of a region (e.g., geographic coordinates for the area covered by the map 210, geographic coordinates for an area of interest), an indication of a tile (e.g., geographic coordinates of the tile, a tile identifier). In addition, the request may include user preferences. The user preferences may identify one or more elements of the network design 200 that are required to be depicted in the requested image. Such elements may include feeder runs, drop runs, distribution runs, terminal nodes, switching devices, and others. For example, a request may specify that the tile display only feeder cable runs, but not cable drops.

At task 1230, server 101 receives the request.

At task 1240, network planner 112 creates network definitions for elements of network design 200. In one aspect, network planner 112 processes a representation of network design 200, such as graph 200, to derive definitions for one or more elements of the network 240. The definitions may include only data that is necessary to render a diagram associated with network design 200 and exclude information that is not needed with respect to the rendering of the diagram.

At task 1250, network planner 112 selects a network element that is part of network 240 based on a selection criterion. The selection criterion may depend on one or more items of information that are included in the request. For example, the selection may be based on the scale of the diagram. If the diagram has a high scale, it may not be practicable to display low-level elements of network 240 such as terminal nodes and drop cable runs. As another example, the network element may be selected based on the area covered by the map obtained at task 1210. If the map covers only a part of the service area 210, network planner 112 may select only network elements that are located in the section of service area 210 that is covered by the map. Similarly, if the requested diagram covers only a tile (e.g tile 221), network planner 112 may select only network elements that are located in the part of the service area that is covered by the tile.

In one aspect, network planner 112 may perform the following test to determine whether a line having a starting point $x[0], y[0]$ and endpoint $x[1], y[1]$ is located within the tile 221 having a bounding box spanning $u[0] \ldots u[1]$ in the horizontal direction and $v[0] \ldots v[1]$ in the vertical direction. The value of $N[i,k]$ is computed and if there exists a value k, such that $N[0,k]*N[1,k]=1$, then the line is found to not intersect the bounding box. However, if for all i there exist k and different from m such that, $N[0,k]*N[1,k]\neq 1$ and $N[i,m]=0$, then the line intersects the bounding area; otherwise, the intersection is undetermined. The function N is defined as $N[i,k]=C[i,0,k]+C[i,1,k]-1$. The function $C[i,j,0]$ is defined as $C[i,j,0]=1$ when $x[i]>u[j]$, otherwise $C[i,j,0]=0$. The function $C[i,j,1]$ is defined as $C[i,j,1]=1$ when $y[i]>v[j]$, otherwise $C[i,j,0]=0$.

At task 1260, server 101 transmits an indication of the element(s) selected at task 1250. For example, network planner 112 may generate an image depicting the selected network element and transmit the generated image. The generated image may be in a transparent bitmap format, JPEG or any other type of format. As another example, server 101 may transmit the definition of the network element.

In one aspect, server 101 transmits indications of elements on a per cluster basis. For instance, server 101 may transmit indication of cable runs that belong to a higher level of the network hierarchy (e.g., feeder cables) first. Server 101 may transmit indications of network elements as soon as their definitions are created and before task 1240 has completed. Put differently, in one aspect, network planner 112 may execute tasks 1240-1260 concurrently.

At task 1270, client device 170 receives the indication of the selected element.

At task 1280, front end 143, in response to receiving the indication, displays a diagram associated with network design 200. The displayed diagram includes the element selected at task 1250. For example, if the selected element is a node (e.g., an endpoint, a switch), the diagram may depict an icon that represents the node. If the selected element is a cable run, the diagram may depict a line, as shown by FIG. 3, that illustrates the path of the cable run.

For example, if the received indication is an image depicting the network element, frontend 143 may display the received image by superimposing it over the map received at task 1210. As another example, frontend 143 may display the diagram associated with the network design 200 (e.g., diagram 220) by generating an overlay request based on a definition of the selected network element, and transmitting the request to a map server, such as GOOGLE MAPS. The overlay request may specify that map server produces a map which depicts the network element (e.g., as shown by diagram 220).

Figure 13:
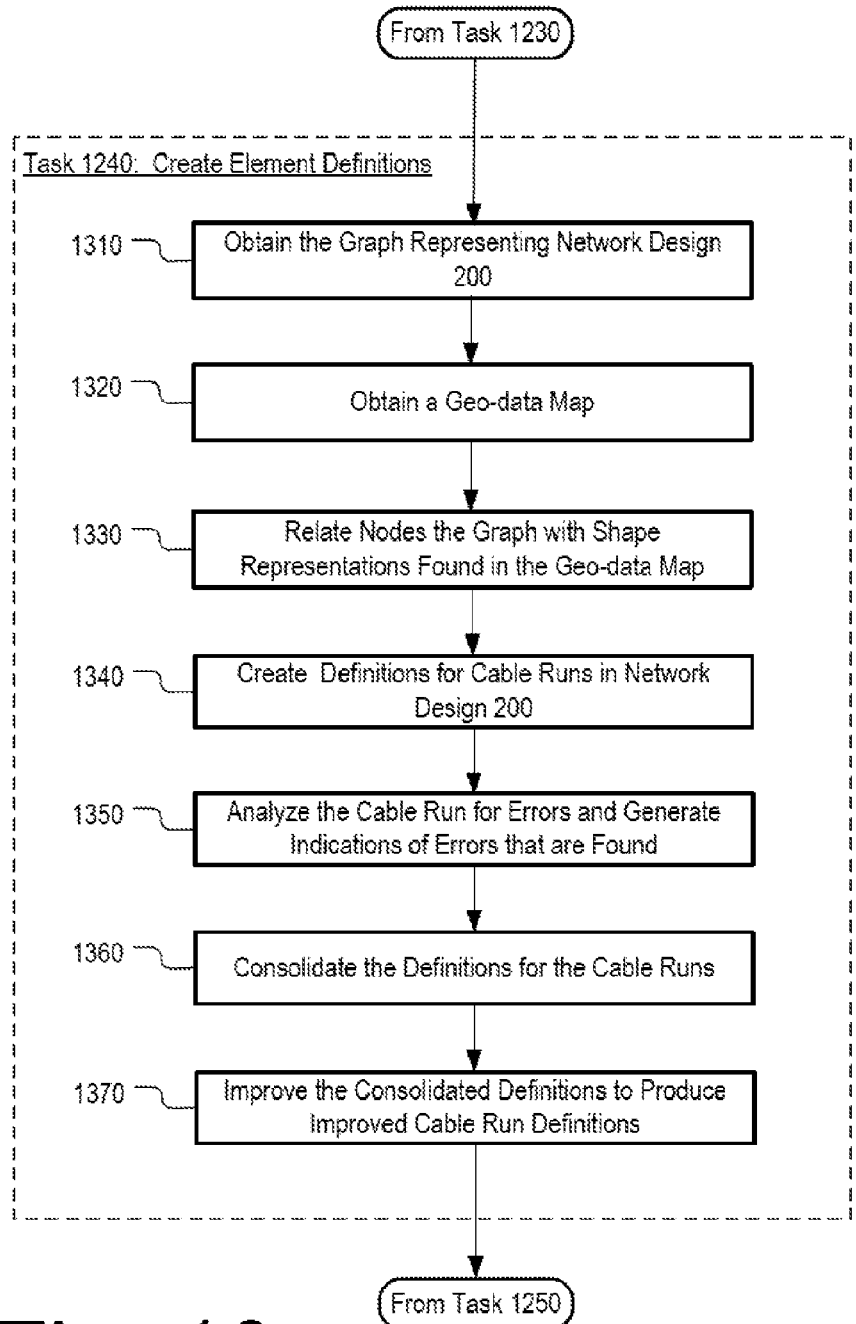
FIG. 13 depicts a flowchart of subtasks associated with FIG. 12.

FIG. 13 depicts a flowchart of the subtasks associated with generating definitions for elements of network design 200 as shown by task 1240 of FIG. 12. In this example, task 560 includes the following subtasks: obtaining the graph for the network design (1310), obtaining a geo-data map (1320), relating nodes in the graph with shape representations found in the geo-data map (1330), creating definitions for cable runs in the network design (1340), consolidating the definitions (1360), and improving the definitions to produce improved definitions (1370).

At task 1310, graph 134 is obtained.

At task 1320, a geo-data map is obtained. The geo-data map may describe service area 210 as a set of possible paths between pairs of locations. Each path may be defined in the geo-data map as a set of one or more vectors. Moreover, the geo-data map may identify a set of geographic shapes, such as roads, road segments, bodies of waters, and other elements typically found in maps.

At task 1330, definitions for one or more nodes (e.g., endpoints, switches) in network 240 are created. The definitions may associate the network nodes with geographic shape representations identified in the geo-data map. The geographic shape representations may be pre-existing shape representations, such as those of lakes, roads, and road intersections. Moreover, new geographic shape representations may be created that correspond to elements of network 240, but not to preexisting geographic landmarks. The geographic shape representations may be non-empty sets of vectors.

In one example, the geographic shapes and the network nodes are related to one another on the basis of their geographic coordinates. That is, if the geographic coordinates associated with an element of graph 134 (e.g., a graph node associated with a switch) correspond to geographic coordinates associated with a geographic shape (e.g., a street intersection), the two are related to one another. The geographic shapes and network nodes may be related to one another by means of a table or another data structure.

At task 1340, representations of one or more cable runs in network 240 are created. Each representation may be created based on information about the cable runs stored in graph 134. Each representation of a cable run includes an indication of the path taken by the cable run. In addition, each representation of a cable run may include an indication of a characteristic of the cable run.

At task 1350, each cable run is analyzed for errors. The error analysis may be performed based on rules stored in database 135. Regarding the errors, as noted above, the assignment of cable runs to tracks performed at task 910 may introduce various errors such as cables runs being set for installation underground on bridges, cables being set to be run in the air across a highway and so forth. Further examples of errors include cable runs being set for installation on a private property or in violations of zoning regulations. Regardless of their nature, possible errors are reflected in the rules stored in database 135. So, each error is tested for by retrieving a rule from the memory 132 and determining whether a particular cable run complies with the retrieved rule. When a cable run is found to violate a rule in the database 135, an indication is generated to indicate the cable run is illegal.

At task 1360, the cable run representations are consolidated so that all cable runs that have the same path in service area 210 become represented by a single cable run definition. In one aspect, in response to a determination that a first cable run and a second cable run are installed along the same path, a consolidated cable run representation is produced that includes an indication of the path taken by the two cable runs. The consolidated cable run may serve as a replacement of the representations of the first cable run and second cable run created at task 1340.

In addition, the consolidated cable run representation may include an indication of a third characteristic. The third characteristic may be based on a rule for combining the first characteristic with the second characteristic. For example, if the first cable run includes 40 strands of optical fiber and the second cable run includes 30 optical strands of fiber, the indication of the third characteristic may indicate that the consolidated cable representation is associated with a total of 70 strands of fiber. Similarly, the rule for combining the characteristic may specify that one type of cable run trumps the other. For instance, if the first cable run is a feeder cable run and the second cable run is a distribution cable run, the third indication may indicate that the consolidated cable run representation is associated with a distribution cable. In that regard, the consolidated cable representation may be displayed as a solid line rather than a dashed line in diagram 220. Thus diagram 220 will not show that the consolidated cable run includes a distribution cable. The indication may involve coloring the cable run a different color in a network diagram, generating a text message, and so forth.

At task 1370, the indications of paths that are part of cable run representations are converted from one format to a second format. For example, when in the first format, a path of a cable run may be represented as sets of segments, each segment expressed as a pair of geographic coordinates. In the second format, however, a cable path may be represented by a beginning coordinate stored followed by one or more definitions of incremental segments. The beginning coordinate may be expressed in double precision floating point format. Each incremental segment may be expressed as a double comprising an indication of incremental orientation and length. The incremental length and orientation of each segment may be stored in single precision floating point format.

Furthermore, one or more of tasks 1340-1370 may be executed on a per cluster basis. For example, in executing the tasks in that manner, network planner 112 may process the feeder cables in network 112 first, then the distribution cables, and then the drop cables. In other words, network planner 112 processes all cable runs in a specific layer of clusters in network design 240 before it moves to another layer.

FIG. 14 depicts a flowchart of the subtasks associated with updating the network design 200 based on user-input modifications as shown by task 580 of FIG. 5. In this example, task 580 includes the following subtasks: receiving an indication to discard a cable run or a node in the network design 200 (1410), receiving an indication of a new node or cable run (1420), storing rule override in database 135 (1430), and updating the network design based on the received user input (1440).

At task 1410, an indication to discard a cable run or a node from the network design 200 is received at server 101 from device 170. The discarding of the node may involve relocating the node to another location in the service area 210 or completely removing the node from the network design. Similarly, the discarding of a cable run may involve completely removing the cable run from the network design 200 or replacing it with a cable run that follows a different track.

For example, as discussed above, a cable run may violate one or more of the rules in database 135 by being set to cross a highway at a point where the highway cannot be crossed. When such cable run is identified, it may be colored in a color different from the color of rule-compliant cable runs (e.g., red) in the diagram 220 of the network design 200. In that regard, this indication of error may be presented to the user with the diagram 220. The user, in response, may instruct the network planner 112 to delete the offending cable run.

As another example, a cable run that is set to connect two points may be inefficient (e.g., very expensive). For example, a cable run connecting two points may circle a whole block of houses, while a shorter route between the two points may exist across a private property. The inefficient cable run may be altogether deleted, thereby denying connectivity to a household in the service area 210, or alternatively it may be replaced by a cable run, specified by the user, that crosses the private property. In the latter instance, the rules in database 135 that prohibit the installation of cables on private property may have to be overridden.

At task 1420, an indication of a new cable or node location is received at server 101 from device 170. For example, referring to the examples above, along with the indication to delete a cable run that violates one or more of the rules in database 135, the user may transmit an indication of a new cable run that replaces the deleted cable run.

At task 1430, an indication is stored in memory 132 that a rule in database 135 does not apply to a cable run. The cable run may be a cable run specified at task 1420 or another cable run. The indication may be stored in response to an explicit user instruction transmitted from device 170 or alternatively, it may be stored in response to receiving an indication of a new (e.g., replacement) cable run. In the latter instance, the rule is implicitly overridden by the user's manually specifying the route for the cable run.

At task 1440, the network design 1440 is recalculated to account for the changes introduced by the user at tasks 1410-1430. For example, only the cluster where the cable run (or node) belongs may be recalculated or alternatively a plurality of clusters may be re-calculated. In either instance, however, the node location/or cable run track that is specified by the user is off limits to network planner 112. In other words, network planner 112, in recalculating the design, does not de-assign nodes and cable runs from user-specified locations or tracks.

FIGS. 5-14 are provided as an example. In some aspects, at least some of the tasks associated with FIGS. 5-13 may be performed in a different order than represented or performed concurrently. Furthermore, in some aspects, some of tasks in FIGS. 5-14 may be altogether omitted.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for providing a design for a fiber-optic network to a client device, the method comprising:
   receiving a request for a diagram associated with a design for a fiber-optic network;
   accessing a data structure representing the design for the fiber-optic network, the data structure identifying:
   (i) a first path of a first cable run and a first characteristic of the first cable run, and
   (ii) a second path of a second cable run and a second characteristic of the second cable run;
   determining if the first path is coincident with the second path, wherein the paths are coincident if the first cable and the second cable can be run along same track;
   generating, by a processor, a representation of a consolidated cable run for display in a diagram of the design of the fiber-optic network when it is determined that the first path is coincident with the second path, the representation of the consolidated cable run including:
   (i) an indication of the first path and the second path, and
   (ii) an indication of a third characteristic of the consolidated cable run that is based on the first characteristic of the first cable run and the second characteristic of the second cable run; and
   transmitting an indication of the representation of the consolidated cable run to the client device for presentation to a user.

2. The method of claim 1, further comprising:
   selecting, by the processor, at least one of the first cable run and the second cable run for inclusion into the diagram;
   wherein the at least one of the first cable run and the second cable run is selected out of a plurality of elements of the fiber-optic network that are located in a region of the fiber-optic network that is to be depicted in the diagram.

3. The method of claim 2, wherein the at least one of the first cable run and the second cable run is selected based on an indication of a scale of a map that is available at the client device.

4. The method of claim 1, wherein the third characteristic relates to one of cost, length, distance, number of cable strands, and installation technology.

5. The method of claim 1, wherein the third characteristic is identical to the first characteristic and different from the second characteristic.

6. The method of claim 1, wherein the third characteristic is different from both the first characteristic and the second characteristic.

7. The method of claim 1, wherein the representation is generated prior to receiving the request.

8. The method of claim 1, wherein the request is for a tile of the diagram.

9. The method of claim 1, wherein the request is for a tile and the representation of the cable run is generated based on an indication of a location of the tile.

10. The method of claim 1, wherein the indication of the first path and the second path comprises a beginning coordinate followed by one or more segment indications, each segment indication comprising an indication of a length of the segment and an indication of an orientation of the segment.

11. An apparatus comprising:
    a processor configured to:
    generate a data structure that represents a design for a fiber-optic network;
    process the data structure to identify a first cable run that is to be installed across a section of a service area;
    determine that the installation of the first cable run across the section of the service area is illegal based on geographical limitations of the service area, the determination being based on one or more rules that limit cable installation based on physical features of one or more sections of the service area;
    transmit an indication that the installation of the first cable run is illegal to a client device;
    receive an indication from the client device to delete the first cable run from the design for the fiber-optic network and to replace the first cable run with a second cable run;
    modify the design for the fiber-optic network to remove the first cable run from the data structure; and include the second cable run in the data structure that represents the design for the fiber-optic network.

12. The apparatus of claim 11, wherein the second cable run has a different track from the first cable run, and the first cable run and the second cable run both connect a first node in the fiber-optic network to a second node in the fiber-optic network.

13. The apparatus of claim 11, wherein the indication that the first cable run is illegal is a color value corresponding to the first cable run.

14. The apparatus of claim 11, wherein the indication that the first cable run is illegal is a text note.

15. The apparatus of claim 11, wherein the processor is further configured to generate a representation of the first cable run for display in a diagram of the design of the fiber-optic network, wherein the indication that the installation of the first cable run is illegal is a color value associated with the representation.

16. A method comprising:
  receiving, at a client device, an indication that a first cable run between two nodes in a fiber-optic network is illegal based on geographical limitations of a service area, wherein the geographical limitations of the service area is based on one or more rules that limit cable installation based on physical features of one or more sections of the service area, the first cable run being part of a design for the fiber-optic network, and the first cable run being generated automatically by a server when the design for the fiber-optic network is produced;
  presenting the indication that the first cable run is illegal and a diagram of a design of the fiber-optic network on a display device;
  receiving at the client device, user input indicating a second cable run that replaces the first cable run; and
  transmitting, from the client device to the server, an indication of the second cable run for modification of the design of the fiber-optic network.

17. The method of claim 16, wherein the presentation of the indication that the first cable run is illegal includes displaying, on the display device, the diagram of the design of the fiber-optic network so that the first cable run is colored differently from cable runs that are legal.

18. The method, of claim 16 wherein the presentation of the indication that the first cable run is illegal includes displaying a text note.

19. The method of claim 16, wherein the presentation of the indication that the first cable run is illegal includes displaying an image.

* * * * *